(12) United States Patent
Ely et al.

(10) Patent No.: US 7,007,151 B1
(45) Date of Patent: Feb. 28, 2006

(54) SYSTEM, DEVICE, AND METHOD FOR CONTROLLING ACCESS TO A MEMORY

(75) Inventors: Richard J. Ely, Sudbury, MA (US); Stanley Chmielecki, Nashua, NH (US)

(73) Assignee: Nortel Networks Limited, (CA)

( * ) Notice: Subject to any disclaimer, the term of this patent is extended or adjusted under 35 U.S.C. 154(b) by 138 days.

(21) Appl. No.: 09/679,461

(22) Filed: Oct. 4, 2000

(51) Int. Cl.
*G06F 12/00* (2006.01)

(52) U.S. Cl. ............... 711/202; 711/100; 711/101; 711/108; 711/111; 711/200; 711/206; 710/1; 710/3; 710/11; 710/100; 710/105; 710/106; 709/227; 709/229; 709/200; 709/201; 709/203; 709/213; 709/214; 370/395.5; 370/395.52; 370/395.7; 370/395.71; 370/395.72; 370/400

(58) Field of Classification Search ............... 711/147, 711/150, 151, 158, 209, 8, 11, 100–101, 108, 711/111, 205, 206, 162, 161, 200, 202; 710/11, 710/105, 106, 305, 314, 315, 1, 3, 100; 709/250, 709/213–214, 227–229, 200–203; 714/37, 714/39; 370/395.5–395.7, 395.52, 395.71–395.72, 370/400

See application file for complete search history.

(56) References Cited

U.S. PATENT DOCUMENTS

| | | | | |
|---|---|---|---|---|
| 4,313,161 A | * | 1/1982 | Hardin et al. ............... 711/151 |
| 4,345,309 A | * | 8/1982 | Arulpragasam et al. ..... 711/140 |
| 5,410,545 A | * | 4/1995 | Porter et al. ................... 714/5 |
| 5,590,313 A | * | 12/1996 | Reynolds et al. ............. 703/26 |
| 5,784,582 A | * | 7/1998 | Hughes ....................... 710/117 |
| 5,875,472 A | * | 2/1999 | Bauman et al. ............. 711/141 |
| 5,892,918 A | * | 4/1999 | Isono et al. ................. 709/227 |
| 5,968,114 A | * | 10/1999 | Wentka et al. .............. 709/100 |
| 6,128,673 A | * | 10/2000 | Aronson et al. .............. 710/22 |
| 6,272,400 B1 | * | 8/2001 | Jankins et al. .............. 700/282 |
| 6,401,178 B1 | * | 6/2002 | Gagne et al. ................ 711/162 |
| 6,594,735 B1 | * | 7/2003 | Baker et al. ................. 711/147 |
| 6,606,698 B1 | * | 8/2003 | Fradette ....................... 711/209 |
| 6,622,220 B1 | * | 9/2003 | Yoshida et al. ............. 711/152 |
| 6,643,749 B1 | * | 11/2003 | Marui ......................... 711/154 |
| 6,675,226 B1 | * | 1/2004 | Nair et al. ................... 709/250 |
| 6,741,258 B1 | * | 5/2004 | Peck et al. .................. 345/568 |

\* cited by examiner

*Primary Examiner*—Matthew Kim
*Assistant Examiner*—Zhuo H. Li
(74) *Attorney, Agent, or Firm*—Steubing McGuinness & Manaras LLP

(57) ABSTRACT

In a system, device, and method for controlling access to a memory, a memory interface device is used to coordinate access to a memory device by a number of host applications. The memory interface device is situated between the number of host applications and the memory device. The memory interface device received memory access requests from the number of host applications, interacts with the memory device for servicing the memory access requests, and provides result/status information to the number of host applications. The memory interface device maintains a separate context for each memory access request in order to correlate each memory access request with the host application that issued the memory access request and the result/status information generated for the memory access request.

44 Claims, 8 Drawing Sheets

SYSTEM, DEVICE, AND METHOD FOR CONTROLLING ACCESS TO A MEMORY

FIELD OF THE INVENTION

The present invention relates generally to computer systems, and more particularly to memory access control in a computer system.

BACKGROUND OF THE INVENTION

In a typical computer system, it is not uncommon for multiple host applications to require access to a single memory device. Typically, memory accesses as well as memory access control functions are performed in software. This provides for relatively slow access to the memory device, and requires coordination between the various host applications.

SUMMARY OF THE INVENTION

In accordance with one aspect of the invention, a memory interface device is used to coordinate access to a memory device by a number of host applications. The memory interface device is situated between the number of host applications and the memory device. The memory interface device received memory access requests from the number of host applications, interacts with the memory device for servicing the memory access requests, and provides result/status information to the number of host applications. The memory interface device maintains a separate context for each memory access request in order to correlate each memory access request with the host application that issued the memory access request and the result/status information generated for the memory access request.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
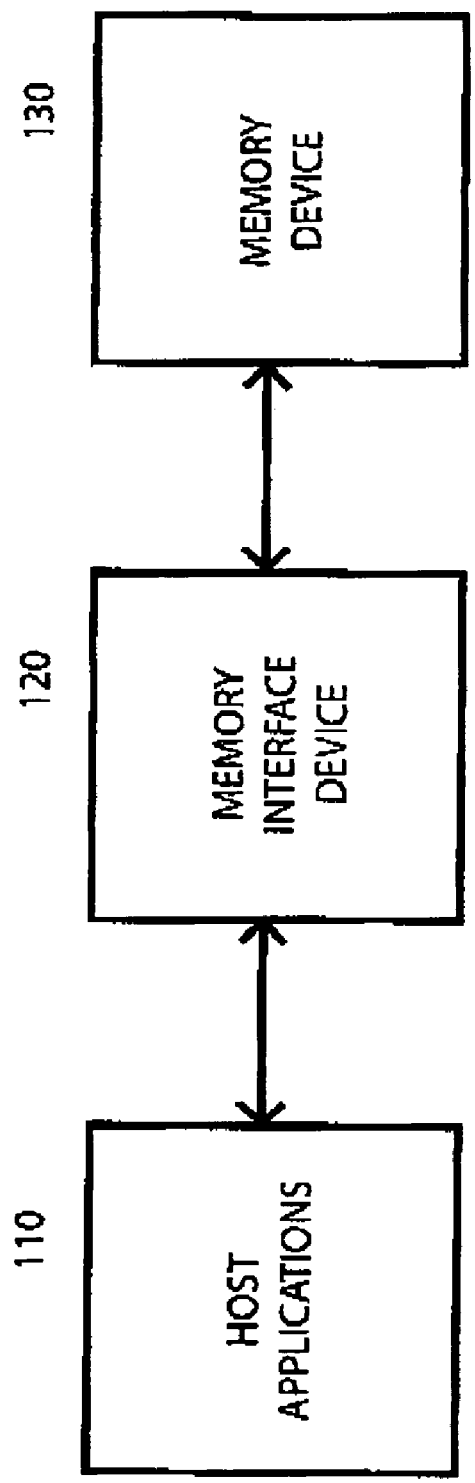
FIG. 1 is a block diagram showing a memory interface device used to interface multiple host applications to a memory device in accordance with an embodiment of the present invention.

In an embodiment of the present invention, a memory interface device is used to coordinate accesses to the memory device by a number of host applications. As shown in FIG. 1, the memory interface device 120 is coupled between the host applications 110 and the memory device 130. The memory interface device 120 receives memory access requests from the host applications 110, interacts with the memory device in order to execute the memory access requests on behalf of the host applications 110, and provides result/status information back to the host applications 110.

In a typical embodiment of the present invention, the host applications 110 and the memory device 130 have different interface requirements. For example, the host applications 110 and the memory device 130 typically have different interface (bus) widths, interface cycles, interface signals, interface protocols, and clocking. The memory interface device 120 interfaces with the host applications 110 through a host interface that conforms to the host application interface and with the memory device 130 through a memory interface that conforms to the memory device interface. Thus, the memory interface device 120 essentially converts or translates between the host application interface and the memory device interface in order to coordinate accesses to the memory device 130 by the host applications 110.

The memory interface device 120 maintains a context for each memory access request. Each context is used to map the memory access request to the host application 110 that issued the memory access request and to the result/status information for the memory access request.

In a typical embodiment of the present invention, the memory interface device 120 maintains a number of internal registers (referred to hereinafter as a "context register set") for each host application 110. Each context register set represents a context. Each context register set is used to receive memory access requests from its corresponding host application 110 and provide result/status information to its corresponding host application 110. By maintaining a context register set for each host application 110, the memory interface device 120 is able to match each memory access request to the host application 110 that generated the memory access request and to the result/status information generated by the memory access request. However, because each host application 110 has access to one and only one context register set, each host application 110 can typically issue one and only one memory access request at a time.

In order for a host application 110 to access the memory device 130, the host application 110 issues a memory access request to the memory interface device 120. Specifically, the host application 110 writes a memory access request into its corresponding context register set by configuring its corresponding context register set accordingly. Writing to a particular register (e.g., an instruction register) typically indicates to the memory interface device 120 that the host application 110 has completed issuing its memory access request.

The memory interface device 120 monitors the context register sets in order to detect memory access requests. Typically, the memory interface device 120 monitors a particular register or register field within each context register set (e.g., an instruction register) that, when written by the respective host application 110, indicates that the host application 110 has completed issuing its memory access request. When the memory interface device 120 detects a memory access request in a particular context register set, the memory interface device 120 services the memory access request on behalf of the corresponding host application 110 by interacting with the memory device 130 on behalf of the host application 110.

The memory interface device 120 typically permits multiple memory access requests from multiple host applications 110 to be pending at any given time. The memory interface device 120 schedules accesses to the memory device 130 in such a way that each pending memory access request is serviced and the context for each host application 110 is maintained (i.e., result/status information is correlated with its respective memory access request and memory access requests do not interfere with one another). The memory interface device 120 may execute each memory access request as an atomic operation, or, if the memory device 130 permits, may pipeline or interleave some or all of the memory access requests. The memory interface device 120 may or may not ensure that the memory access requests are serviced in the order in which they are received from the host applications 110.

When the memory interface device 120 completes a memory access request for a particular host application 110, the memory interface device 120 typically provides a signal to the host application 110. The signal indicates that the memory access request is complete and the result/status information is available.

In a typical embodiment of the present invention, the memory interface device 120 maintains a validity indicator in each context register set for indicating that the corresponding memory access request is complete and the result/status information is available. The memory interface device 120 typically clears the validity indicator in the context register set when a memory access request is received and sets the validity indicator in the context register set when the memory access request is complete and the result/status information is available. Alternatively or additionally, the memory interface device 120 may generate an interrupt or other signal when the memory access request is complete and the result/status information is available.

Thus, after issuing the memory access request, the host application 110 waits for the memory interface device 120 to signal that the memory access request is complete and the result/status information is available before reading the result/status information from the memory interface device 120. For example, the host application 110 may suspend itself until the memory access request is complete, monitor for completion of the memory access request (e.g., by monitoring the validity indicator in its corresponding context register set), or continue with other tasks until interrupted by the memory interface device 120.

Figure 2:
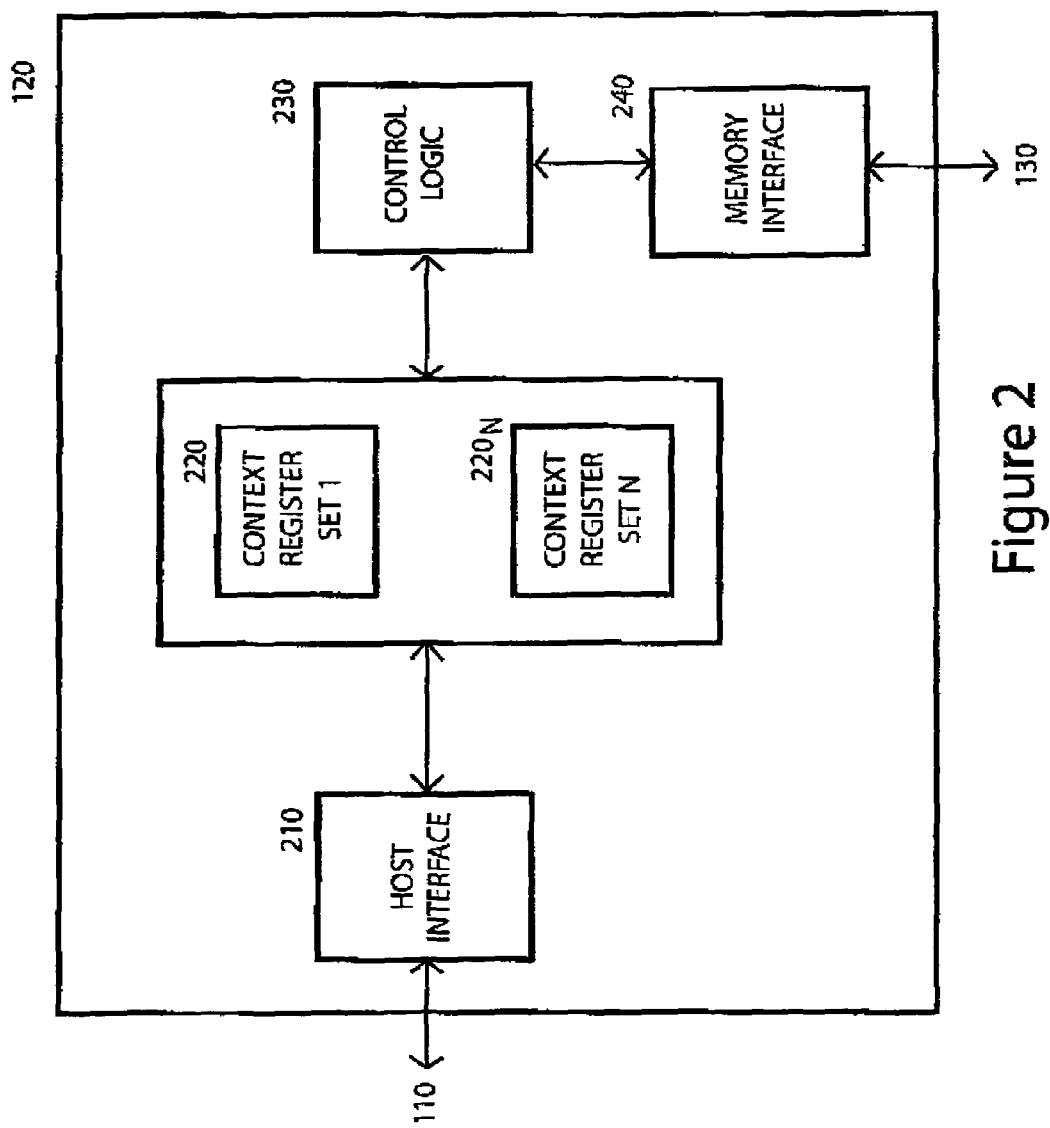
FIG. 2 is a block diagram showing the relevant logic blocks of an exemplary memory interface device in accordance with an embodiment of the present invention.

FIG. 2 shows the relevant logic blocks of an exemplary memory interface device 120. Among other things, the memory interface device 120 includes a host interface 210, a number of context register sets 220$_1$–220$_N$ (referred to individually as a context register set 220 and collectively as the context register sets 220), control logic 230, and a memory interface 240. The memory interface device 120 communicates with the host applications 110 over the host interface 210 according to the host interface protocol. The memory interface device 120 communicates with the memory device 130 over the memory interface 240 using the memory interface protocol. The memory interface device 120 maintains a context register set 220 for each of the host applications 110 for receiving memory access requests from the host applications 110 and providing result/status information to the host applications 110. The control logic 230 monitors the context register sets 220 to detect memory access requests, services the memory access requests, interacts with the memory device 130 over the memory interface 240 in order to execute the memory access requests, and provides result/status information to the host applications 110.

Figure 3:
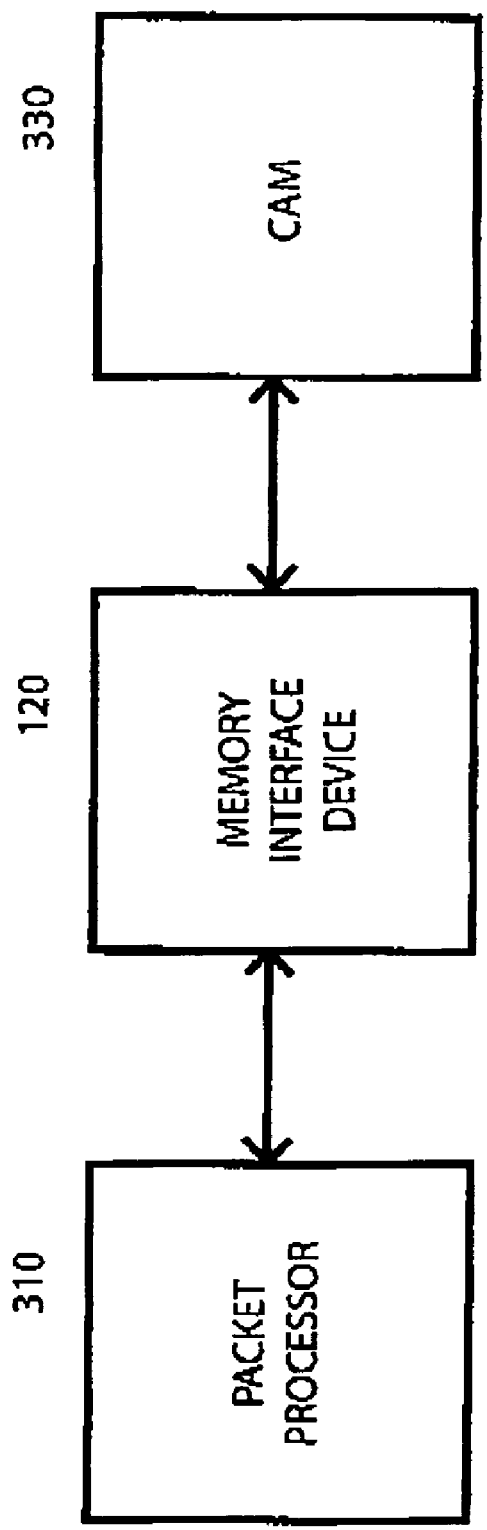
FIG. 3 is a block diagram showing a memory interface device used to interface a packet processor having multiple packet processing contexts to a Content-Addressable Memory (CAM) in accordance with an embodiment of the present invention.

In an exemplary embodiment of the present invention, the described memory interface device 120 is used in a router or other networking device to coordinate accesses to a Content-Addressable Memory (CAM) by multiple packet processing engines of a packet processor. As shown in FIG. 3, the memory interface device 120 is coupled between the packet processor 310 and the CAM 330. The CAM 330 is a memory device that is used to store certain types of packet processing information such as routing/forwarding information. In order to process packets received over various router interfaces, the packet processing engines of the packet processor 310 search for routing/forwarding information in the CAM 330 by issuing memory access requests to the memory interface device 120. The CAM 330 essentially enables all memory locations to be searched simultaneously using a single memory access request, and typically provides a mechanism for "masking out" irrelevant bits and fields in the search (e.g., for searching based upon an address/prefix). When organized in an ordered list format, the CAM 330 typically returns the "best" match for a particular search.

The interface to the packet processor 310 is typically a 32-bit pipelined ZBT SRAM interface with fixed three-cycle operations. The interface to the CAM 330 is typically a 128-bit multicycle, wide access interface with concurrent instruction and control buses that enable memory accesses to be pipelined in order to reduce latency. Thus, with reference again to FIG. 2, the host interface 210 of the memory interface device 120 conforms to the packet processor 310 interface, and the memory interface 240 of the memory interface device 120 conforms to the CAM 330 interface.

The packet processor 310 typically includes four (4) independent packet processing engines. Each packet processing engine typically has four (4) independent packet processing contexts. Each packet processing context can independently issue memory access requests to the memory interface device 120 through a corresponding context memory set 220. Thus, each packet processing context represents one of sixteen (16) host applications 110. An exemplary memory interface device 120 therefore includes at least sixteen (16) context memory sets 220, one for each of the packet processing contexts supported by the packet processor 310. Each context memory set 220 typically includes eight 32-bit registers including, among other things, registers for providing comparand, control, and instruction information by the packet processing context and registers for providing result/status information (including a validity indicator) by the memory interface device 120.

In order for a packet processing context to access the CAM 330, the packet processing context issues a memory access request to the memory interface device 120 by configuring its corresponding context register set 220 in the memory interface device 120 accordingly. Memory accesses include such things as search operations and various CAM maintenance operations (e.g., invalidating, moving, loading, testing). An instruction register in each context register set 220 is typically used to specify the type of memory access for a particular memory access request.

The control logic 230 monitors the context register sets 220 in order to detect memory access requests. Typically, the control logic 230 monitors the instruction register in the context register set 220 to determine when a memory access request has been stored in the context register set 220. When the instruction register is written by the respective packet processing context, indicating that the context register set 220 includes a complete memory access request, the control logic 230 services the memory access request on behalf of the corresponding packet processing context. Specifically, the control logic 230 typically clears the validity indicator in the context register set 220 and schedules the appropriate memory accesses to execute the memory access request.

The control logic 230 typically permits multiple memory access requests from multiple packet processing contexts to be pending at any given time. In order to reduce latency, the control logic 230 typically pipelines accesses to the CAM 330 over the memory interface 240 when it is able to do so. Specifically, the CAM 330 interface is a multicycle interface that enables multiple memory access operations to be performed during each memory access cycle. Under certain circumstances, it may be possible for the control logic 230 to schedule its servicing of the memory access requests in such a way that, during a particular memory access cycle, some memory access operations relate to one memory access request while other memory access operations relate to another memory access request. Such pipelining enables the control logic 230 to begin servicing one memory access request before completing another memory access request. However, because certain types of memory access requests and memory access operations can conflict, the control logic 230 monitors for memory access requests and memory access operations that conflict and executes those memory access requests and memory access cycle operations as atomic operations (i.e., without pipelining). This typically involves completing any memory access operations that are in the pipeline before executing the conflicting memory access request or memory access operation.

When the control logic 230 completes a memory access request for a particular packet processing context, the control logic 230 typically stores result/status information and sets the validity indicator in the corresponding context register set 220. The result/status information typically includes result data (e.g., data read from the CAM 330) as well as various status information (e.g., single match, multiple matches). The setting of the validity indicator enables the packet processing context to determine that the memory access request is complete and the result/status information is available.

Thus, the control logic 230 includes logic for monitoring the context register sets 220 to detect memory access requests, logic for scheduling memory access operations for servicing the memory access requests, and logic for providing result/status information. The logic for scheduling memory access operations for servicing the memory access requests includes logic for pipelining memory access operations, logic for detecting conflicting memory access requests and memory access operations, and logic for executing memory access requests and memory access operations as atomic operations to prevent conflicts.

Figure 4:
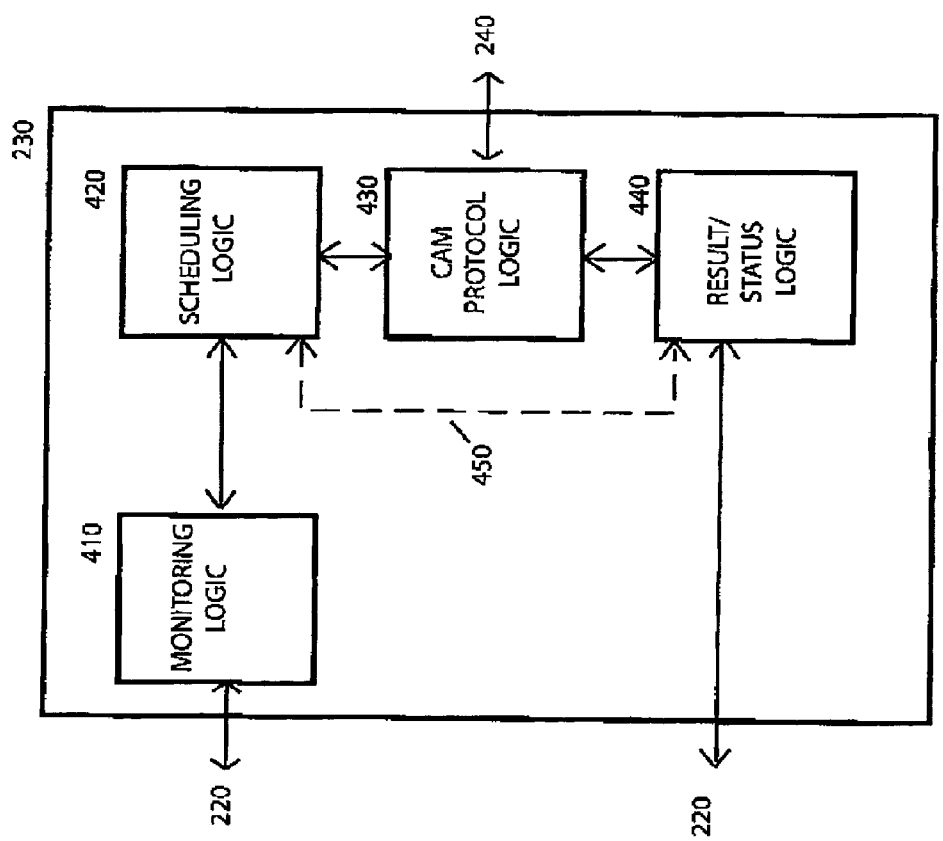
FIG. 4 is a block diagram conceptually showing the relevant logic blocks of the memory interface device control logic in accordance with an embodiment of the present invention.

FIG. 4 conceptually shows the relevant logic blocks of the control logic 230. Among other things, the control logic 230 includes monitoring logic 410, scheduling logic 420, CAM protocol logic 430, and result/status logic 440. The monitoring logic 410 monitors the context register sets 220 to detect memory access requests and provides the memory access requests to the scheduling logic 420 for servicing. The scheduling logic 420 schedules memory access operations for the memory access requests using both pipelining (when possible) and atomic operations. The CAM protocol logic 430 generates the appropriate CAM 330 interface signals for interfacing with the CAM 330 via the memory interface 240. Coordination between the scheduling logic 420 and the result/status logic 440, as shown by the dashed line 450, enables the result/status logic 440 to correlate result/status information with its corresponding memory access request and store the result/status information in the corresponding context register set 220.

Figure 5:
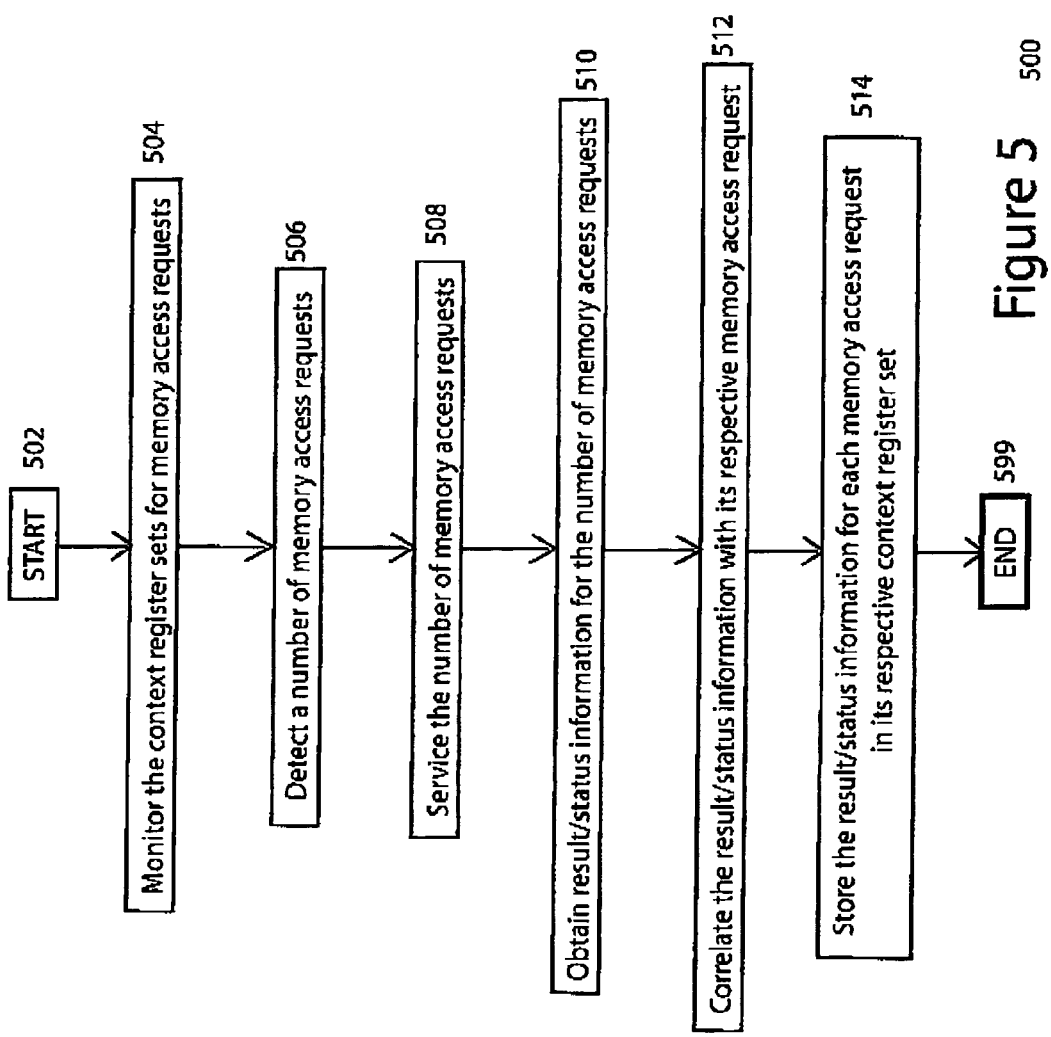
FIG. 5 is a logic flow diagram generically describing the operation of the memory interface device control logic in accordance with an embodiment of the present invention.

FIG. 5 shows an exemplary logic flow 500 generically describing the operation of the control logic 230. Beginning in block 502, the logic monitors the context register sets 220 for memory access requests, in block 504. The logic detects a number of memory access requests, in block 506, and services the number of memory access requests, in block 508. The logic obtains result/status information for the number of memory access requests, in block 510, correlates the result/status information with its respective memory access request, in block 512, and stores the result/status information for each memory access request in its respective context register set 220, in block 514. The logic 500 terminates in block 599.

Figure 6:
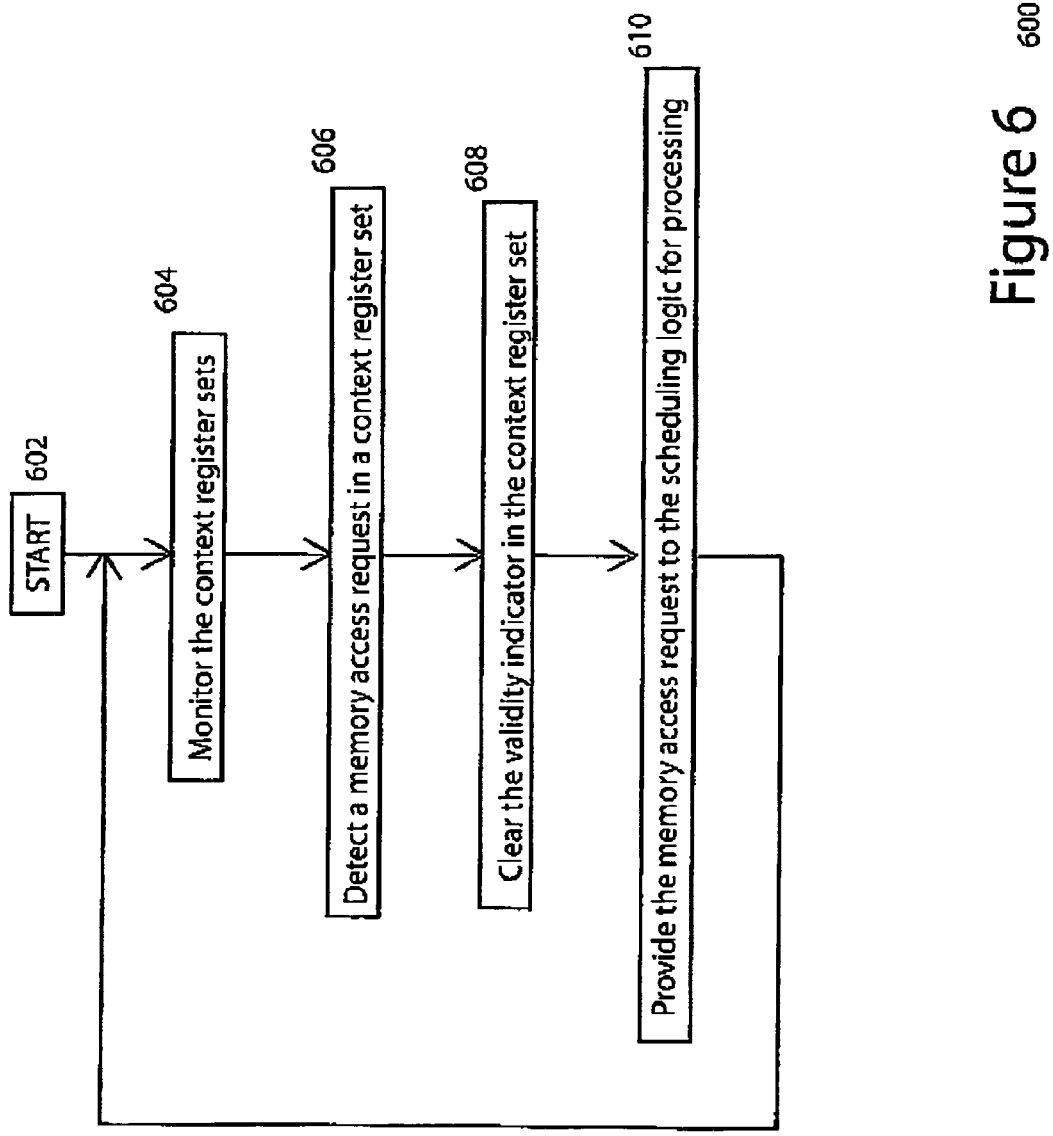
FIG. 6 is a logic flow diagram describing the operation of the monitoring logic of the memory interface device control logic in accordance with an embodiment of the present invention.

FIG. 6 shows an exemplary logic flow 600 describing the operation of the monitoring logic 410. Beginning in block 602, the logic monitors the context register sets 220, in block 604. When the logic detects a memory access request in a context register set 220, in block 606, the logic clears the validity indicator in the context register set 220, in block 608, and provides the memory access request to the scheduling logic 420 for servicing, in block 610. The logic 600 recycles to block 604 to monitor for subsequent memory access requests.

Figure 7:
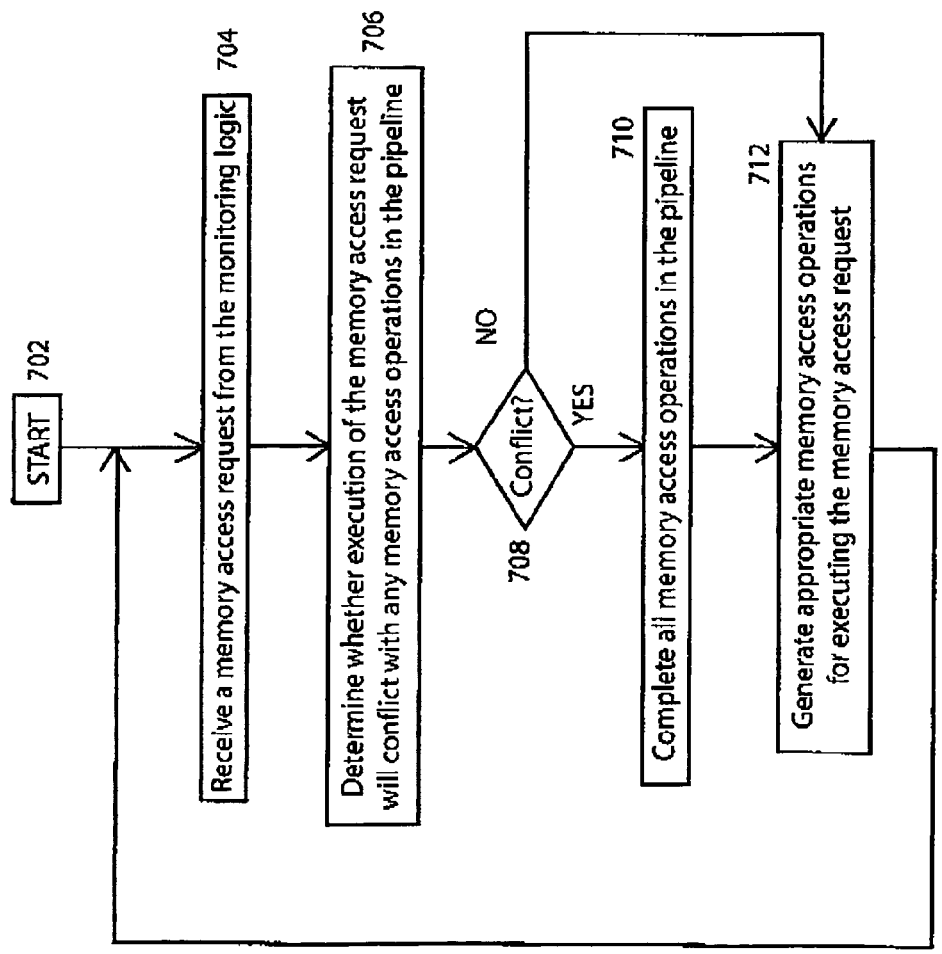
FIG. 7 is a logic flow diagram describing the operation of the scheduling logic of the memory interface device control logic in accordance with an embodiment of the present invention.

FIG. 7 shows an exemplary logic flow 700 describing the operation of the scheduling logic 420. Beginning in block 702, and upon receiving a memory access request from the monitoring logic 410, in block 704, determines whether execution of the memory access request will conflict with any memory access requests in the pipeline, in block 706. If execution of the memory access request will not conflict with any memory access requests in the pipeline (NO in block 708), then the logic generates the appropriate memory access operations for executing the memory access request, in block 712. If execution of the memory access request will conflict with any memory access requests in the pipeline (YES in block 708), then the logic completes all memory access operations in the pipeline, in block 710, and then generates the appropriate memory access operations for executing the memory access request, in block 712. The logic 700 recycles to block 704 to service subsequent memory access requests.

Figure 8:
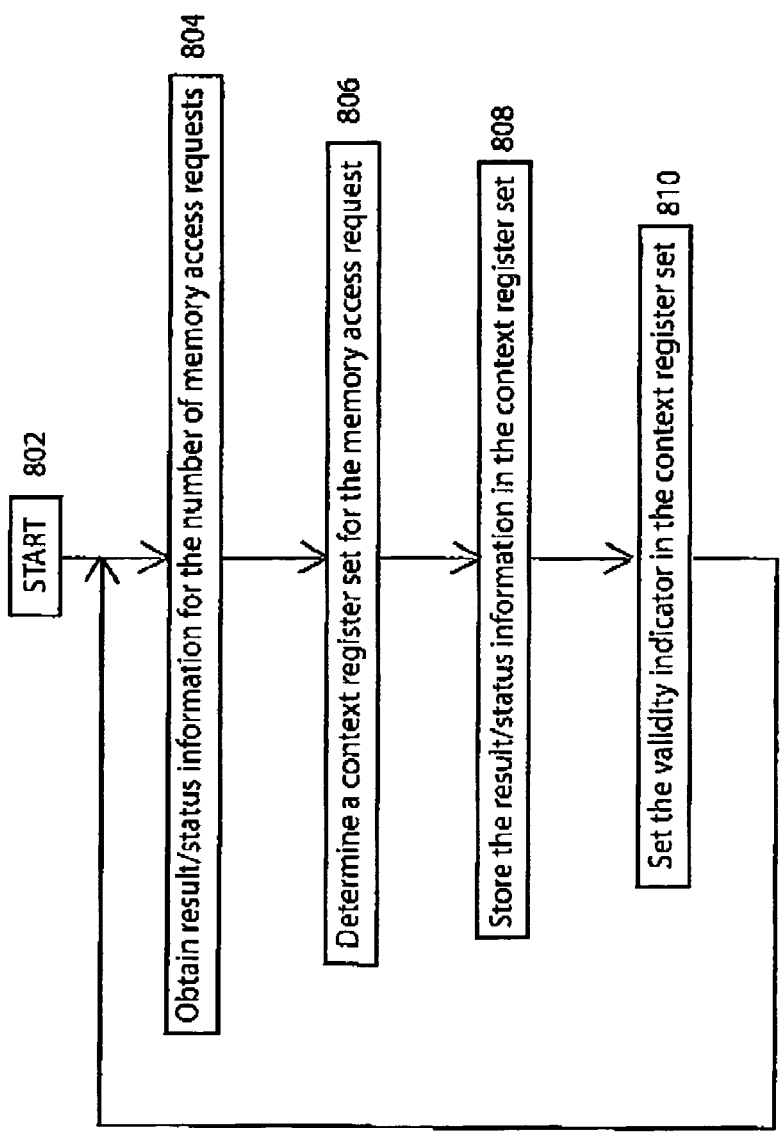
FIG. 8 is a logic flow diagram describing the operation of the result/status logic of the memory interface device control logic in accordance with an embodiment of the present invention.

FIG. 8 shows an exemplary logic flow 800 describing the operation of the result/status logic 440. Beginning in block 802, the logic obtains result/status information for a memory access request, in block 804. The logic determines a context register set 220 for the memory access request, in block 806, stores the result/status information in the context register set 220, in block 808, and sets the validity indicator in the context register set 220, in block 810. The logic 800 recycles to block 804 to provide result/status information for subsequent memory access requests.

In the exemplary embodiments described above, the memory interface device 120 is used to interface multiple host applications 110 to the memory device 130. However, the memory interface device 120 may be used even for interfacing a single host application 110 to the memory device 130, particularly when the host application(s) 110 and the memory device 130 have different interfaces. This is because the memory interface device 120 essentially converts or translates between the host application interface and the memory device interface in order to service the memory access requests on behalf of the host application(s). Thus, the present invention is not limited to any particular number of host applications 110.

In the exemplary embodiments described above, the memory interface device 120 maintains various internal registers for receiving the memory access requests and providing the result/status information. However, the present invention is in no way limited to such use of registers. For one example, rather than including registers, the memory interface device 120 could include a random access memory (RAM) or other type of memory through which the memory access requests are received and the result/status information is provided (e.g., through a set of descriptors). For another example, the host interface could be message-based such that the host application(s) 110 and the memory interface device 120 exchange information in the form of communication messages.

In the exemplary embodiments described above, the memory interface device 120 maintains one context register set for each host application 110, typically limiting each host application 110 to one and only one memory access request at a time. However, the present invention is in no way limited to maintaining one context register set for each host application 110. Other mechanisms may be used to permit each host application 110 to issue more than one memory access request at a time. For one example, the memory interface device 120 could maintain multiple context register sets for each host application 110, thereby permitting each host application 110 to issue multiple memory access requests. For another example, the memory interface device 120 could maintain multiple general-purpose context register sets and permit each host application 110 to issue multiple memory access requests.

In the exemplary embodiments described above, writing to an instruction register by the host application 110 signals to the memory interface device 120 that a memory access request is ready for servicing. However, the present invention is in no way limited to such use of the instruction register for signaling that the memory access device is ready for servicing. Other mechanisms may be used to signal to the memory interface device 120 that a memory access request is ready for servicing. For example, a separate register or field within a register may be used to signal to the memory interface device 120 that a memory access request is ready for servicing.

In the exemplary embodiments described above, a validity indicator is used to signal the host application 110 that the memory access request is complete and result/status information is available. However, the present invention is in no way limited to the use of a validity indicator for signaling that the memory access request is complete and result/status information is available. Other mechanisms may be used to signal that the memory access request is complete and result/status information is available. For example, the memory interface device 120 could generate an interrupt when the memory access request is complete and result/status information is available.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, the memory interface device 120 is a FPGA that is loaded with appropriate program logic to define the logic gates and registers for interfacing the packet processor 310 and the CAM 330 as described herein. The packet processor 310, memory interface device 120, and CAM 330 are components of a router or other networking device.

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a memory interface device for interfacing a number of host applications to a memory device. The memory interface device includes a host interface for interfacing with the number of host applications, a memory interface for interfacing with the memory device, a number of contexts for receiving memory access requests from the number of host applications and providing result/status information to the number of host applications, and control logic for obtaining memory access requests from the number of contexts, interacting with the memory device over the memory interface for servicing the memory access requests on behalf of the number of host applications, and providing the result/status information to the number of host applications via the number of contexts. The number of host applications may include a number of packet processing contexts of a packet processor, in which case the host interface conforms to a packet processor interface. The memory device may be a content-addressable memory (CAM), in which case the memory interface conforms to a CAM interface. The number of contexts may be embodied as a number of context registers sets. In a typical embodiment, each context register set corresponds to one and only one of the number of host applications. The control logic typically includes monitoring logic, scheduling logic, memory interface logic, and result/status logic. The monitoring logic monitors the number of contexts for detecting memory access requests and provides the memory access requests to the scheduling logic. The scheduling logic schedules memory access operations for the memory access requests. The memory interface logic generates memory interface signals for interfacing with the memory device over the memory interface. The result/status logic provides result/status information to the number of host application(s). The monitoring logic may monitor a predetermined register (such as an instruction register) in each context register set to detect a memory access request. The memory interface may support pipelining of memory access operations, and the scheduling logic may pipeline a plurality of memory access requests over the memory interface. The scheduling logic may determine that a plurality of memory access requests conflict, clear the pipeline, and execute at least one of the conflicting memory access requests as an atomic operation. The result/status logic correlates result/status information with its corresponding memory access request and stores the result/status information for each memory access request in a corresponding context. The result/status logic may set a validity indicator in each context when the corresponding memory access is complete and the result/status information is available. The memory interface device may be embodied as a programmed programmable logic device (such as a programmed FPGA) or an ASIC.

The present invention may also be embodied as program logic for programming a programmable logic device. The program logic includes host interface logic for interfacing with the number of host applications, memory interface logic for interfacing with the memory device, a number of contexts for receiving memory access requests from the number of host applications and providing result/status information to the number of host applications, and control logic for obtaining memory access requests from the number of contexts, interacting with the memory device using the memory interface logic for servicing the memory access requests on behalf of the number of host applications, and providing the result/status information to the number of host applications via the number of contexts. The number of host applications may include a number of packet processing contexts of a packet processor, in which case the host interface conforms to a packet processor interface. The memory device may be a content-addressable memory (CAM), in which case the memory interface conforms to a CAM interface. The number of contexts may be embodied as a number of context registers sets. In a typical embodiment, each context register set corresponds to one and only one of the number of host applications. The control logic typically includes monitoring logic, scheduling logic, memory interface logic, and result/status logic. The monitoring logic monitors the number of contexts for detecting memory access requests and provides the memory access requests to the scheduling logic. The scheduling logic schedules memory access operations for the memory access requests. The memory interface logic generates memory interface signals for interfacing with the memory device over the memory interface. The result/status logic provides result/status information to the number of host application(s). The monitoring logic may monitor a predetermined register (such as an instruction register) in each context register set to detect a memory access request. The memory interface may support pipelining of memory access operations, and the scheduling logic may pipeline a plurality of memory access requests over the memory interface. The scheduling logic may determine that a plurality of memory access requests conflict, clear the pipeline, and execute at least one of the conflicting memory access requests as an atomic operation. The result/status logic correlates result/status information with its corresponding memory access request and stores the result/status information for each memory access request in a corresponding context. The result/status logic may set a validity indicator in each context when the corresponding memory access is complete and the result/status information is available. The program logic may be embodied in a computer readable medium for loading into the programmable logic device.

The present invention may also be embodied as an apparatus including a number of host applications, a memory device, and a memory interface device interposed between the host applications and the memory device for receiving memory access requests from the number of host applications, interacting with the memory device on behalf of the number of host applications for servicing the memory access requests, and providing result/status information to the host applications.

The present invention may be embodied in other specific forms without departing from the true scope of the invention. The described embodiments are to be considered in all respects only as illustrative and not restrictive.

We claim:

1. A memory interface device for interfacing a number of host applications to a memory device, the memory interface device comprising:
   a host interface for interfacing with the number of host applications in a protocol associated with the corresponding host application;
   a memory interface for interfacing with the memory device wherein one or more of the host applications and the memory device operate in response to different protocols;
   a number of contexts operably coupled to the host interface for receiving memory access requests from the number of host applications and providing result/status information to the number of host applications, wherein each context corresponds to one and only one of the number of host applications; and
   control logic operably coupled to obtain memory access requests from the number of contexts, translate the memory access requests into memory access requests in accordance with a protocol of the memory device, interact with the memory device over the memory interface for servicing the memory access requests on behalf of the number of host applications, and provide the result/status information to the number of host applications via the number of contexts in accordance with the protocol associated with each of the number of host applications.

2. The memory interface device of claim 1, wherein the number of host applications comprises a number of packet processing contexts of a packet processor, and wherein the host interface conforms to a packet processor interface.

3. The memory interface device of claim 1, wherein the memory device comprises a content-addressable memory (CA, and wherein the memory interface conforms to a CAM interface.

4. The memory interface device of claim 1, wherein the number of contexts comprise a number of context registers sets.

5. The memory interface device of claim 1 wherein the control logic comprises:
monitoring logic;
scheduling logic;
memory interface logic; and
result/status logic, wherein:
the monitoring logic is operably coupled to monitor the number of contexts for detecting memory access requests and providing the memory access requests to the scheduling logic;
the scheduling logic is operably coupled to schedule memory access operations for the memory access requests;
the memory interface logic is operably coupled to generate memory interface signals for interfacing with the memory device over the memory interface; and
the result/status logic is operably coupled to provide result/status information to the number of host application(s).

6. The memory interface device of claim 5, wherein each context comprises a context register set, and wherein the monitoring logic is operably coupled to monitor a predetermined register in each context register set to detect a memory access request.

7. The memory interface device of claim 5, wherein the predetermined register comprises an instruction register.

8. The memory interface device of claim 5, wherein the memory interface supports pipelining of memory access operations, and wherein the scheduling logic is operably coupled to pipeline a plurality of memory access requests over the memory interface.

9. The memory interface device of claim 8, wherein the scheduling logic is operably coupled to determine that a plurality of memory access request conflict and execute at least one of the conflicting memory access requests as an atomic operation.

10. The memory interface device of claim 9, wherein the scheduling logic is operably coupled to clear the pipeline in order to execute the conflicting memory access request as an atomic operation.

11. The memory interface device of claim 5, wherein the result/status logic is operably coupled to correlate result/status information with its corresponding memory access request.

12. The memory interface device of claim 5, wherein the result/status logic is operably coupled to store the result/status information for each memory access request in a corresponding context.

13. The memory interface device of claim 12, wherein each context comprises a validity indicator, and wherein the result/status logic is operably coupled to set the validity indicator in each context when the corresponding memory access is complete and the result/status information is available.

14. The memory interface device of claim 1 embodied as programmed programmable logic device.

15. The memory interface device of claim 1 embodied as an application specific integrated circuit.

16. Program logic for programming a programmable logic device the program logic comprising:
host interface logic for interfacing with a number of host applications, the host interface logic operating according to a first interface protocol;
memory interface logic for interfacing with a memory device, the memory interface logic operating according to a second, different protocol;
a number of contexts operably coupled to the host interface logic for receiving memory access requests from the number of host applications and providing result/status information to the number of host applications, wherein each context corresponds to one and only one of the number of host applications; and
control logic operably coupled to obtain memory access requests from the number of contexts in the first interface protocol, translate the memory access requests into memory access requests in the second interface protocol, interact with the memory device using the memory interface logic for servicing the memory access request on behalf of the number of host applications, and provide the result/status information to the number of host applications via the number of contexts in accordance with the first interface protocol.

17. The program logic of claim 16, wherein the number of host applications comprises a number of packet processing contexts of a packet processor, and wherein the host interface logic conforms to a packet processor interface.

18. The program logic of claim 16, wherein the memory device comprises a content addressable memory (CAM), and wherein the memory interface logic conforms to a CAM interface.

19. The program logic of claim 16, wherein the number of contexts comprises a number of context registers sets.

20. The program logic of claim 16, wherein the control logic comprises:
monitoring logic;
scheduling logic;
memory interface logic; and
result/status logic, wherein:
the monitoring logic is operably coupled to monitor the number of contexts for detecting memory access requests and providing the memory access requests to the scheduling logic;
the scheduling logic is operably coupled to schedule memory access operations for the memory access requests;
the memory interface logic is operably coupled to generate memory interface signals for interfacing with the memory device using the memory interface logic; and
the result/status logic is operably coupled to provide result/status information to the number of host application(s).

21. The program logic of claim 20, wherein each context comprises a context register set, and wherein the monitoring logic is operably coupled to monitor a predetermined register in each context register set to detect a memory access request.

22. The program logic of claim 21, wherein the predetermined register comprises an instruction register.

23. The program logic of claim 20, wherein the memory interface supports pipelining of memory access operations, and wherein the scheduling logic is operably coupled to pipeline a plurality of memory access requests over the memory interface.

24. The program logic of claim 23, wherein the scheduling logic is operably coupled to determine that a plurality of memory access requests conflict and execute at least one of the conflicting memory access requests as an atomic operation.

25. The program logic of claim 24, wherein the scheduling logic is operably coupled to clear the pipeline in order to execute the conflicting memory access request as an atomic operation.

26. The program logic of claim 20, wherein the result/status logic is operably coupled to correlate result/status information with its corresponding memory access request.

27. The program logic of claim 20, wherein the result/status logic is operably coupled to store the result/status information for each memory access request in a corresponding context.

28. The program logic of claim 27, wherein each context comprises a validity indicator, and wherein the result/status logic is operably coupled to set the validity indicator in each context when the corresponding memory access is complete and the result/status information is available.

29. The program logic of claim 16 embodied in a computer readable medium.

30. An apparatus comprising:
a number of host applications;
a memory device, wherein one or more of the host applications and the memory device operate using different protocols; and
a memory interface device interposed between the host applications and the memory device and operably coupled to receive memory access requests from the number of host applications, translate the memory access requests into requests in accordance with a protocol of the memory device, interact with the memory device on behalf of the number of host applications for servicing the memory access requests, and provide result/status information to the host applications in accordance with a protocol of each of the number of host applications, wherein the memory interface comprises:
a host interface for interfacing with the number of host applications;
a memory interface for interfacing with the memory device;
a number of contexts operably coupled to the host interface for receiving memory access requests from the number of host applications providing result/status information to the number of host applications, wherein each context corresponds to one and only one of the number of host applications; and
control logic operably coupled to obtain memory access requests from the number of contexts, interact with the memory device over the memory interface for servicing the memory access requests on behalf of the number of host applications, and provide the result/status information to the number of host applications via the number of contexts.

31. The apparatus of claim 30, wherein the number of host applications comprises a number of packet processing contexts of a packet processor, and wherein the host interface conforms to a packet processor interface.

32. The apparatus of claim 30, wherein the memory device comprises a content-addressable memory (CAM), and wherein the memory interface conforms to a CAM interface.

33. The apparatus of claim 30, wherein the number of contexts comprises a number of context registers sets.

34. The apparatus of claim 30, wherein the control logic comprises:
monitoring logic;
scheduling logic;
memory interface logic; and
result/status logic, wherein:
the monitoring logic is operably coupled to monitor the number of contexts for detecting memory access requests and providing the memory access requests to the scheduling logic;
the scheduling logic is operably coupled to schedule memory access operations for the memory access requests;
the memory interface logic is operably coupled to generate memory interface signals for interfacing with the memory device over the memory interface; and
the result status logic is operably coupled to provide result/status information to the number of host application(s).

35. The apparatus of claim 34, wherein each context comprises a context register set, and wherein the monitoring logic is operably coupled to monitor a predetermined register in each context register set to detect a memory access request.

36. The apparatus of claim 35, wherein the predetermined register comprises an instruction register.

37. The apparatus of claim 34, wherein the memory interface supports pipelining of memory access operations, and wherein the scheduling logic is operably coupled to a pipeline a plurality of memory access requests over the memory interface.

38. The apparatus of claim 37, wherein the scheduling logic is operably coupled to determine that a plurality of memory access requests conflict and execute at least one of the conflicting memory access requests as an atomic operation.

39. The apparatus of claim 38, wherein the scheduling logic is operably coupled to clear the pipeline in order to execute the conflicting memory access request as an atomic operation.

40. The apparatus of claim 34, wherein the result/status logic is operably coupled to correlate result/status information with its corresponding memory access request.

41. The apparatus of claim 34, wherein the result/status logic is operably coupled to store the result/status information for each memory access request in a corresponding context.

42. The apparatus of claim 41, wherein each context comprises a validity indicator, and wherein the result/status logic is operably coupled to set the validity indicator in each context when the corresponding memory access is complete and the result/status information is available.

43. The apparatus of claim 30, wherein the memory interface device is a programmed programmable logic device.

44. The apparatus of claim 30, wherein the memory interface device is an application specific integrated circuit.

* * * * *